United States Patent
Wahl et al.

[19]

[11] Patent Number: 6,035,626
[45] Date of Patent: Mar. 14, 2000

[54] GAS TURBINE STARTER ASSIST TORQUE CONTROL SYSTEM

[75] Inventors: Robert E. Wahl; Richard F. Stokes, both of Phoenix, Ariz.

[73] Assignee: Allied-Signal Inc., Morris County, N.J.

[21] Appl. No.: 08/525,227

[22] Filed: Sep. 7, 1995

Related U.S. Application Data

[63] Continuation of application No. 08/280,267, Jul. 26, 1994, abandoned, which is a continuation of application No. 08/033,626, Mar. 16, 1993, abandoned.

[51] Int. Cl.[7] .............................. F02C 13/10; H02P 5/20
[52] U.S. Cl. .................. 60/39.02; 60/39.142; 290/40 A; 318/146; 318/712
[58] Field of Search ............................. 60/39.02, 39.142, 60/39.141; 74/6, 7 R; 244/53 A; 290/40 A, 52, 10, 13, 24, 26, 33, 35, 37 R, 41; 318/432–434, 146, 147, 712, 715, 717, 719, 721–723

[56] References Cited

U.S. PATENT DOCUMENTS

| | | | |
|---|---|---|---|
| 3,470,691 | 10/1969 | Smith | 60/39.142 |
| 3,793,826 | 2/1974 | Holleboom et al. | |
| 3,937,974 | 2/1976 | Lafuze | 60/39.142 |
| 4,043,119 | 8/1977 | Faulkner | |
| 4,119,861 | 10/1978 | Gocho | |
| 4,276,743 | 7/1981 | LaGrone | |
| 4,281,509 | 8/1981 | LaGrone | |
| 4,337,615 | 7/1982 | LaCroix | |
| 4,456,830 | 6/1984 | Cronin | |
| 4,473,752 | 9/1984 | Cronin | |
| 4,494,372 | 1/1985 | Cronin | 60/39.142 |
| 4,627,234 | 12/1986 | Schuh | |
| 4,684,081 | 8/1987 | Cronin | |
| 4,708,030 | 11/1987 | Cordner | |
| 4,841,216 | 6/1989 | Okada | |
| 4,868,406 | 9/1989 | Glennon | |
| 4,942,493 | 7/1990 | Rozman | |
| 4,968,926 | 11/1990 | Dhyanchand | |
| 4,984,425 | 1/1991 | Smith | |
| 4,992,721 | 2/1991 | Latos | |
| 5,028,803 | 7/1991 | Reynolds | |
| 5,051,670 | 9/1991 | De Piola | |
| 5,123,239 | 6/1992 | Rodgers | 60/39.142 |
| 5,127,220 | 7/1992 | Jesrai et al. | 60/39.02 |
| 5,165,223 | 11/1992 | Ingham et al. | |
| 5,172,543 | 12/1992 | White | |
| 5,212,943 | 5/1993 | Harris et al. | 60/39.141 |
| 5,428,275 | 6/1995 | Carr et al. | |

FOREIGN PATENT DOCUMENTS

| | | | |
|---|---|---|---|
| 234 055 | 9/1996 | European Pat. Off. | |
| 2131377 | 5/1990 | Japan | |
| 1059236 | 12/1983 | U.S.S.R. | 60/39.142 |
| 587527 | 1/1944 | United Kingdom | |

OTHER PUBLICATIONS

Fact Sheet on Air Turbine Starter, ATS 100–239, Garrett Fluid Systems, PA163–24, Sep., 1990.

*Primary Examiner*—Brian Sircus
*Assistant Examiner*—William Wicker
*Attorney, Agent, or Firm*—Finnegan, Henderson Farabow, Garrett & Dunner

[57] ABSTRACT

An electronic control system for regulating the amount of torque applied by a starter/generator to a gas turbine engine during startup. The control system senses engine speed, compares the engine's actual acceleration with a predetermined acceleration, and adjusts the torque to the engine so that the engine accelerates along the predetermined schedule. The predetermined schedule is a function of the engine's speed or time, inlet conditions and oil temperature.

6 Claims, 2 Drawing Sheets

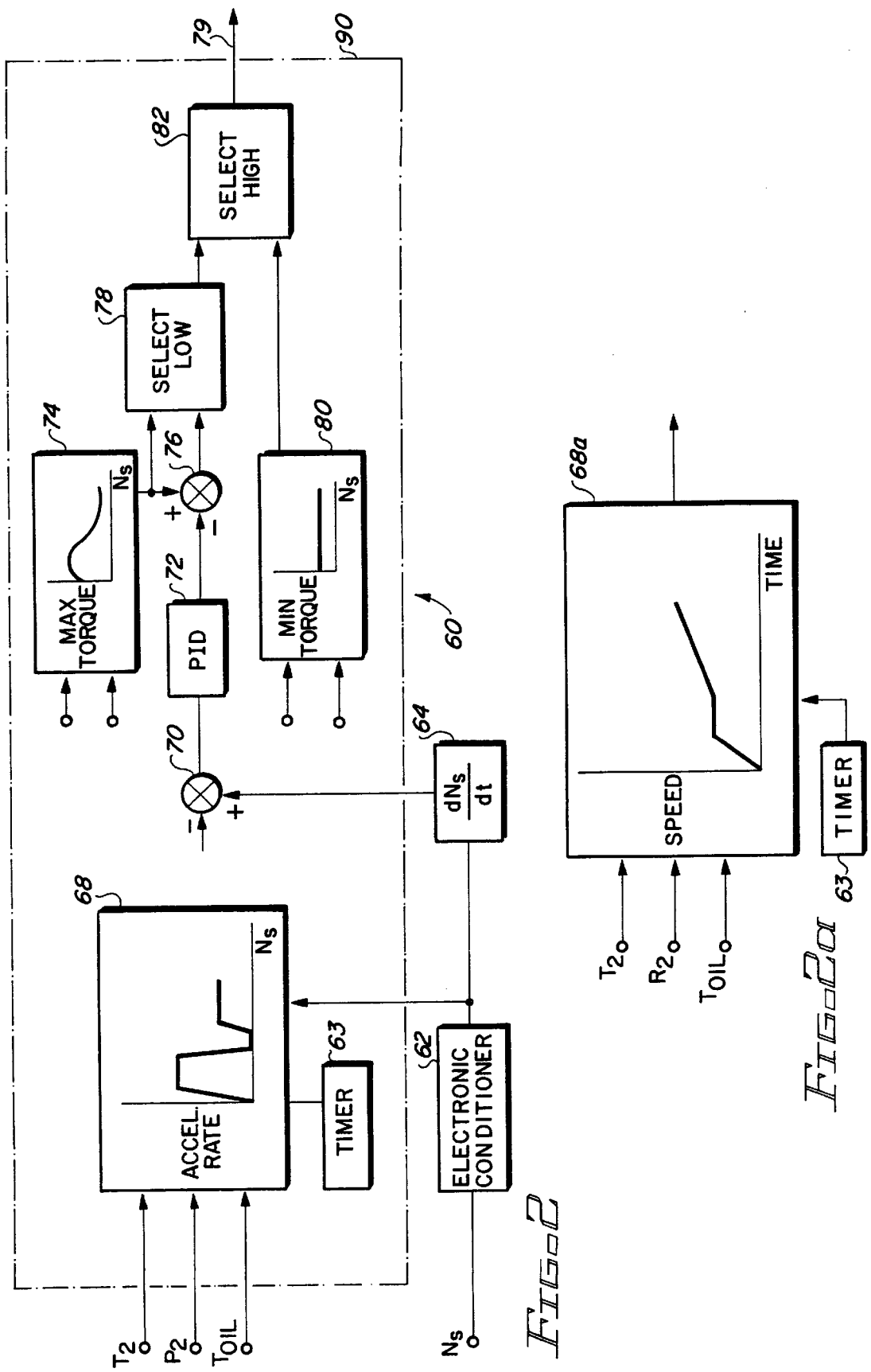

GAS TURBINE STARTER ASSIST TORQUE CONTROL SYSTEM

This is a continuation of application Ser. No. 08/280,267, filed Jul. 26, 1994, now abandoned, which is a continuation of application Ser. No. 08/033,626, filed Mar. 16, 1993, now abandoned.

TECHNICAL FIELD

This invention relates to a control system for regulating the amount of torque applied by a starter/generator to a gas turbine engine during startup.

BACKGROUND OF THE INVENTION

A gas turbine engine includes in flow series arrangement a compressor, a combustor, and a turbine. The compressor and the turbine are mounted for rotation on a shaft which drives a gearbox. Coupled to the gearbox are accessories such as an AC electric generator and lube pump.

To start a gas turbine engine, a starter motor applies torque to the engine's shaft. As the shaft starts to rotate, air is inducted into the compressor, compressed and then discharged in the combustor. Concurrently, the engine's fuel control system feeds fuel into the combustor in accordance with a preprogrammed fuel schedule to precisely maintain the proper fuel to air ratio in the combustor. At a rotational speed of about 10 to 20 percent of the engine's operating speed, the conditions in the combustor become such that the fuel/air mixture can be ignited. This condition is generally referred to as light-off. Should the fuel to air ratio be either too rich or too lean, light-off will not occur and the engine will experience a hung start. After light-off the starter motor torque is augmented by torque from the engine's turbine. At about 50 percent of operating speed the starter motor is shut off, the engine is now self sustaining and accelerates itself to operating speed.

DC motors are commonly used as starters. A disadvantage of DC motors is for a given power supply that their torque versus speed characteristic is fixed. Consequently, the DC motor must be sized to produce starting torque under the worst condition, (i.e. greatest engine drag), which is a cold soaked engine. As a result, DC motors are not efficient at warmer temperatures. Another disadvantage to DC motors is that they cannot dwell at a particular speed or in any way change their output as a function of energy consumption.

To overcome the disadvantages associated with DC motors, it has been proposed to use the engine's AC generator as an AC starter motor. Copending U.S. patent application Ser. No. 08/011,022, now U.S. Pat. No. 5,325,042, and Ser. No. 07/987,524, incorporated herein by reference, disclose power converters that converts an AC generator into an AC motor. Generators in combination with such power converters are referred to as starter/generators. Because the power converter can regulate the power consumption of the starter/generator from either a DC or AC source, it can be controlled to provide any starting torque characteristic, (torque vs. speed), desired.

Accordingly, a need exists for a control system for a starter/generator that maintains a desired acceleration of the engine with minimum expenditure of energy, and which automatically adjusts the amount of torque to account for changes in engine drag due to cold soak or any other conditions to which the engine is exposed.

SUMMARY OF THE INVENTION

An object of the present invention is to provide a control system for a starter/generator that maintains a desired acceleration of the engine with minimum expenditure of energy.

Another object of the present invention is to provide a control system for a starter/generator that automatically adjusts the amount of torque to account for changes in engine drag.

Yet another object of the present invention is to provide a control system for a starter generator that can dwell at a selected engine speed.

Yet still another object of the present invention is to provide a control system for a starter generator that will accelerate a gas turbine engine according to a predetermined start schedule.

Yet still another object of the present invention is to provide a method of accelerating a gas turbine engine through a starter/generator so that the engine accelerates along a predetermined schedule.

The present invention achieves the above-stated objects by providing a control system that electronically controls the torque applied to the engine by a starter/generator so that the engines accelerates along a predetermined schedule programmed in the control system.

These and other objects, features and advantages of the present invention are specifically set forth in or will become apparent from the following detailed description of a preferred embodiment of the invention when read in conjunction with the accompanying drawing.

BRIEF DESCRIPTION OF THE DRAWINGS

FIG. 2 is a block diagram of the starter control system contemplated by the present invention for use with the gas turbine engine of FIG. 1.

FIG. 2a is a block diagram of an alternative embodiment of the starter control system of FIG. 2.

DESCRIPTION OF THE PREFERRED EMBODIMENT

Figure 1:
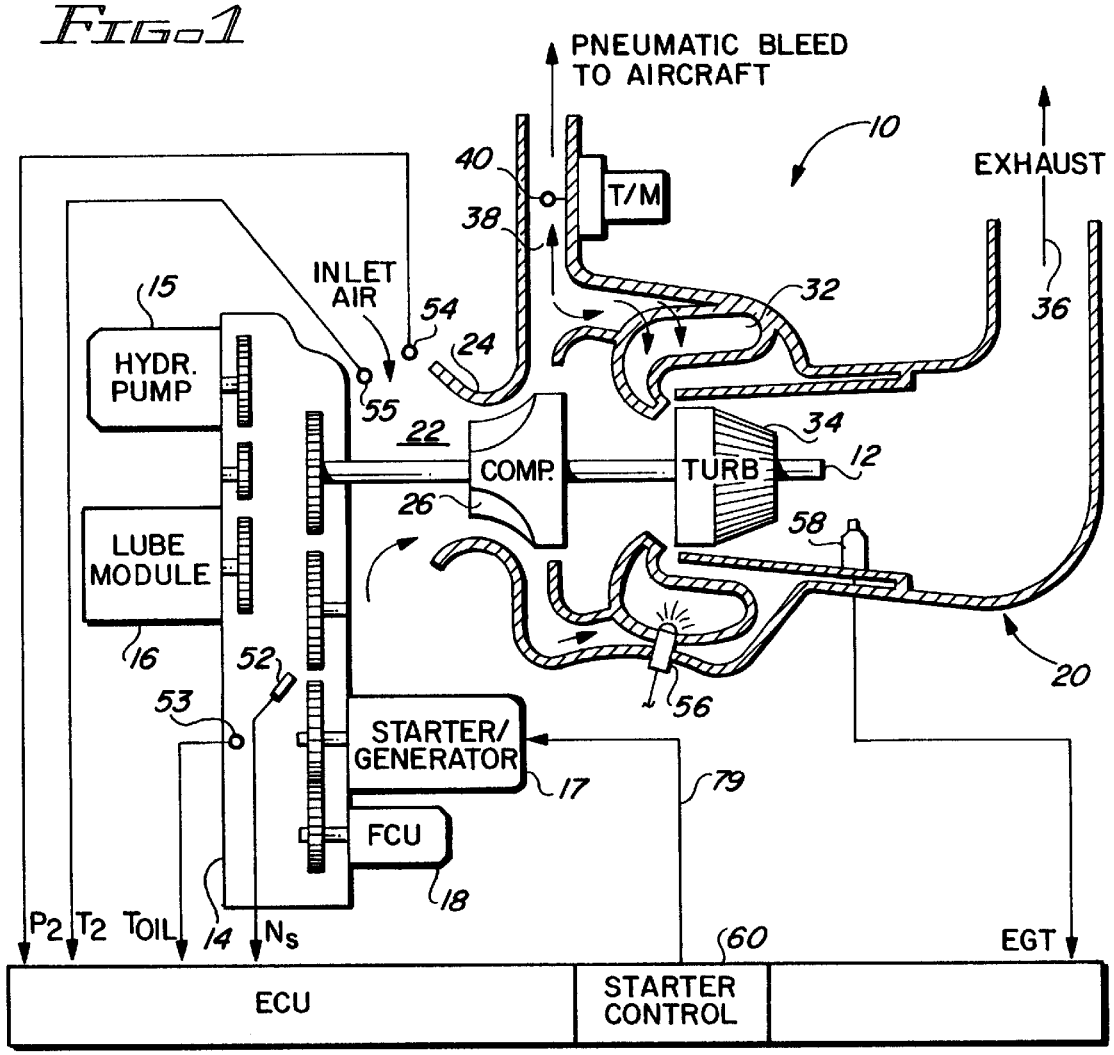
FIG. 1 is a schematic cross-section of an exemplary gas turbine engine in which a starter control system embodying the principles of the present invention is incorporated.

Referring to FIG. 1, a gas turbine engine to which the present invention relates is generally denoted by the reference numeral 10. For purposes of illustration, the engine 10 is depicted as an integral bleed engine even though the present invention is equally applicable to differently configured engines including those used to provide propulsion. The engine 10 includes an accessory gearbox 14 having mounted thereto a hydraulic pump 15, a lube module 16, a fuel control unit 18, and a starter/generator 17. The starter/generator 17 can be any AC synchronous generator having a converter capable of starting the generator as a synchronous motor. Examples of such converters are discussed in the "Background of the Invention" section.

The gas turbine engine 10 is comprised in flow series arrangement of an air inlet 22, a compressor 24, which includes an impeller 26 mounted for rotation on the shaft 12, a combustor 32, a turbine 34 operatively coupled to the impeller 26 via the shaft 12, and an exhaust gas outlet 36. An integral bleed port 38 having a load control valve 40 for regulating the amount of bleed flow is disposed between the compressor 24 and the combustor 32. Upon rotation of the shaft 12, air is inducted through the inlet 22 and pressurized in the compressor 24. The required bleed flow is bled off through the bleed port 38, with the remainder of the pressurized air entering the combustor 32 where it is mixed with fuel and ignited to form a hot, pressurized gas. This gas is then expanded across the turbine 34 to supply power to drive the compressor 24 and the accessory gearbox 14.

An electronic control unit (ECU) 50 controls the overall operation of the engine 10. Preferably, the ECU 50 is digital, though it can be analog. The ECU 50 receives an engine speed signal Ns from a speed sensor 52, an oil temperature from a temperature sensor 53 mounted in the sump of the gearbox 14 which indicates the degree of cold soak; an inlet pressure signal P2 from a pressure sensor 54 mounted in the engine inlet 22 which is indicative of altitude; and an inlet temperature signal T2 from a temperature sensor 55 mounted in the inlet 22.

A starter control 60 is electronically integrated with the ECU 50 and receives the P2, T2, Ns, and Toil signals. The starter control 60 contains the start logic for the engine 10, which is preferably implemented by a microprocessor 90 programmed to perform the functions shown in FIG. 2. These functions can be programmed by a person skilled in the art. Alternatively, the start logic can be implemented in the form of an analog circuit.

Referring to FIG. 2, the starter control 60 has a speed conditioner 62 that receives the Ns signal and converts it to digital form. The output of the conditioner 62 is fed to a rate generator 64 which takes derivative of the Ns signal and generates signal indicative of the engine's 10 actual angular acceleration rate, which is related to torque.

Predetermined angular acceleration rates for the engine 10 are stored in a function generator 68 as sets of discrete points. The acceleration rates are predetermined by the use of computer modeling of the engine in combination with test results. The function generator 68 receives input signals T2, P2, Toil, and Ns. In response to these input signals, the function generator 68 provides a desired acceleration rate signal. The function generator 68 includes a four-dimensional table that indicates desired acceleration rates as a function of the input signals. For input signals that fall between discrete points, the function generator 68 performs a quadruple interpolation to derive the corresponding acceleration rate. Quadruple interpolation routines are well known in the art as are four dimensional function generators. Alternatively, an algorithm describing the predetermined schedule can be programmed into the function generator 68.

A dwell point is programmed into the start logic. At a preselected speed, the function generator 68 drops the desired acceleration rate to zero halting the acceleration of the engine 10 so that the engine 10 maintains the preselected speed. The ECU 50 commands the control 60 to resume acceleration of the engine 10 after receiving an EGT signal indicating ignition has occurred. Alternatively, after a preselected period of time, measured by a timer 63, the function generator resumes generating a desired acceleration schedule, and the engine 10 accelerates. This pause in the acceleration of the engine 10 is called a dwell point, and assures that ignition is occurring in the combustor 32. The timer 63 can be the crystal in the microprocessor 90 or in analog form a conventional timer circuit.

A summing junction 70 combines the actual acceleration signal from the rate generator 64 with the predetermined acceleration signal from the function generator 68 to produce an error signal equal to their difference. This error signal is then processed, in a manner familiar to those skilled in the art, by a conventional proportional, integral, derivative controller, into a torque control signal indicative of the difference between desired torque and actual torque.

A second function generator 74 receives the Ns signal from the conditioner 62 and in response thereto generates a signal indicative of a maximum torque. The maximum torque is selected so that under the worst conditions for startup, (cold soak at altitude), sufficient torque is available to accelerate the engine without over torquing the engine. Over torquing can structurally damage the engine. The function generator 74 has an external input so that the maximum torque schedule can be adjusted after it is programmed into the microprocessor 90.

A third function generators 80 also receives the conditioned Ns signal and in response thereto generates a signal indicative of a minimum torque. The function generator 74 also has an external input so that the minimum torque schedule can be adjusted after it is programmed into the microprocessor 90.

A summing junction 76 subtracts the signal from controller 72 from the signal generated by the function generator 74 to form a signal indicative of required torque. A low select gate receives the signal from the function generator 74 and summing junction 76 and selects the lower of the two signals. A high select gate 82 receives the signals from the low select gate 78 and the function generator 80 and transmits the higher of these signals to the starter/generator 17 as represented by arrow 79.

In an alternative open loop embodiment, instead of receiving the conditioned Ns signal, the function generators 68, 74, and 80 receives a signal of elapsed time from startup as measured by the timer 63. The rate generator 64 is eliminated, and the function generator 68 is replaced with a function generator 68a which generates a signal indicative of desired speed as a function of elapsed time. A dwell point is also programmed into the function generator 68a. In the event that for some reason the engine cannot accelerate, the error signal at the comparator will get very large. When the magnitude of this error signal exceeds a preselected value, an inhibitor, (not shown), will inhibit the timer so as allow the engine's speed to catch up to the desired speed.

Figure 3:
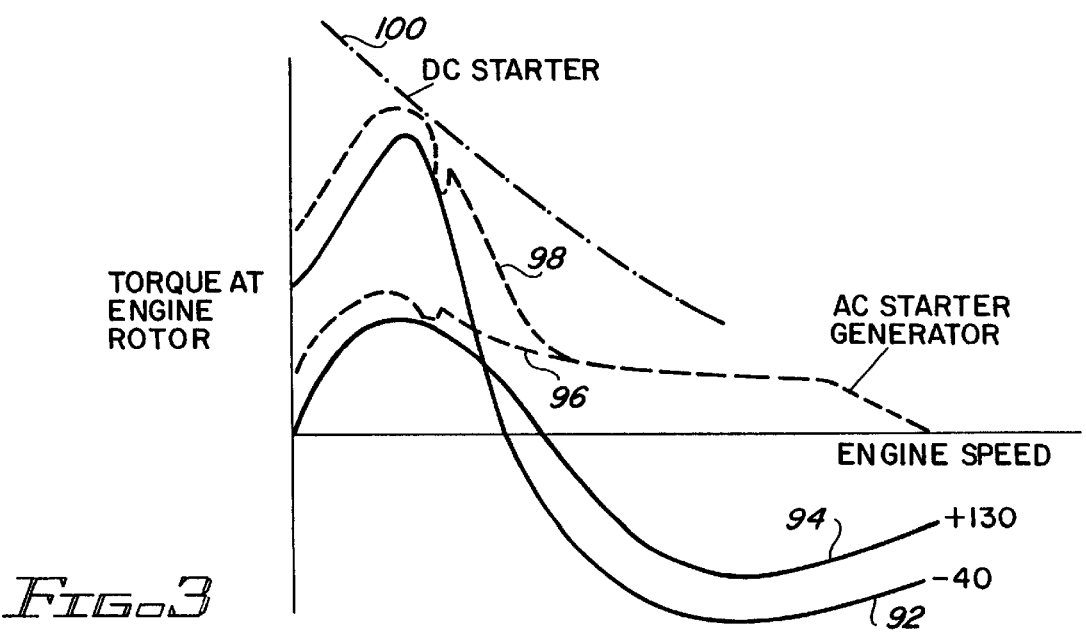
FIG. 3 is a graph of torque vs. speed.

FIG. 3 is a graph of torque at the engine's rotor versus engine speed. The solid lines 92, 94 represents the engine's 10 torque vs. speed characteristic during a startup for inlet temperatures of −40° F., a cold day, and +130° F., a hot day. Initially, because of drag, which is also referred to as unfired torque, the torque at the engine rotor is positive. However, once the combustor 32 is lit-off, the turbine 34 starts driving the shaft 12 and the torque at the rotor becomes negative. This condition is referred to as fired torque.

A preselected start schedule for the engine 10 is programmed into the control system 60. In the preferred embodiment, this start schedule calls for accelerating the engine at a rate of 3% per second until the engine reaches a speed of about 15% of its operating speed. Then holding the engine at 15% of its operating speed, (i.e. no acceleration), for 5 seconds to assure that ignition has occurred. After the 5 seconds, accelerating the engine at a rate of about 1% per second until the engine reaches 60% of its operating speed. At about 20% of its operating speed the engine is able to accelerate itself. However, to prevent excessive temperatures in the engine, the schedule calls for torque from the starter/generator until 60% speed. The advantage of the present invention is that for a particular start schedule, the starter/generator delivers the optimum torque. That is it only delivers the amount of torque necessary to keep the engine on the schedule. This is shown in FIG. 3, where the difference between a dashed line and a solid line for a given inlet temperature is that amount of torque necessary to drive the engine along the preselected schedule.

In comparison, the line 100 shows the output of a prior art DC starter. The DC starter output is fixed and cannot be altered with changes in inlet temperature. Accordingly, it must be sized to provide sufficient torque on a cold day which results in a large amount of excess starting torque on a hot day. In addition, once started the DC motor runs in accordance with its torque characteristic and cannot be halted to, to wait for the igniter to fire. In contrast, with the control 60 the torque output of the starter/generator is optimum for a preselected acceleration schedule. The excess torque or inefficiency associated with prior art DC starters and air turbine starters is eliminated.

Thus, the present invention provides a control system for controlling the torque applied by a starter/generator to a gas turbine engine during startup that accelerates engines according to a predetermined acceleration schedule with minimum expenditure of energy, and which automatically adjusts the amount of torque applied to account for changes in engine drag due to cold soak or any other conditions to which the engine is exposed.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A method of starting a gas turbine engine along a preselected start schedule comprising the steps of:

providing a starter/generator for driving said engine;

sensing engine speed and generating a first signal thereof;

sensing elapsed time of the engine start;

producing a second signal, in response to said elapsed time, indicative of a predetermined speed for said engine;

combining said first and second signals to form an error signal; and adjusting the torque output of said starter/generator in response to said error signal so that said starter/generator only delivers the torque necessary to keep the engine accelerating along the schedule.

2. The method of claim 1 wherein said start schedule includes holding said engine at a constant speed for a preselected period of time.

3. A system for starting a gas turbine engine along a preselected start schedule, comprising:

a starter/generator drivingly coupled to said engine;

a sensor that senses the speed of said engine;

a first signal produced by said sensor;

a timer for determining elapsed time from the engine start;

a second signal produced by the system, corresponding to the elapsed time determined by said timer, that is indicative of a predetermined speed for the engine;

an error signal formed from said first signal and said second signal; and a controller that adjusts the current flow from the starter/generator to adjust the torque output of said starter/generator based on said error signal, so that said starter/generator only delivers the torque necessary to keep the engine accelerating along the schedule.

4. A system for controlling the torque applied by a starter/generator to a gas turbine engine during startup, comprising:

means for sensing the speed of said engine;

means for measuring the elapsed time of said startup;

means for establishing a predetermined speed schedule for said engine as a function of said elapsed time;

means responsive to said speed sensing means for generating a signal indicative of said engine's actual speed;

means for producing an error signal when said engine's actual speed deviates from said predetermined schedule; and means responsive to said error signal for adjusting the torque applied to said engine by said starter/generator so that said engine accelerates along said predetermined schedule.

5. A method for controlling the amount of torque applied by a starter/generator to a gas turbine engine during startup, wherein said engine accelerates along a predetermined schedule, said method comprising the steps of:

(a) accelerating said engine at a rate of about 3% per second up until said engine reaches a speed of about 15% of its operating speed;

(b) holding said engine at 15% of its operating speed, while igniting a fuel/air mixture in said engine;

(c) after ignition of said engine, accelerating said engine at about 1% per second;

(d) after said engine reaches 60% of its operating speed, shutting down said starter generator; and (e) accelerating said engine in a self sustaining manner to its operating speed.

6. The system of claim 3, wherein said sensor also senses inlet conditions of said engine and an oil temperature of said engine.

* * * * *